Dec. 28, 1965 E. H. PROCTER 3,225,744
STOCK LOADER
Filed April 16, 1964 2 Sheets-Sheet 1
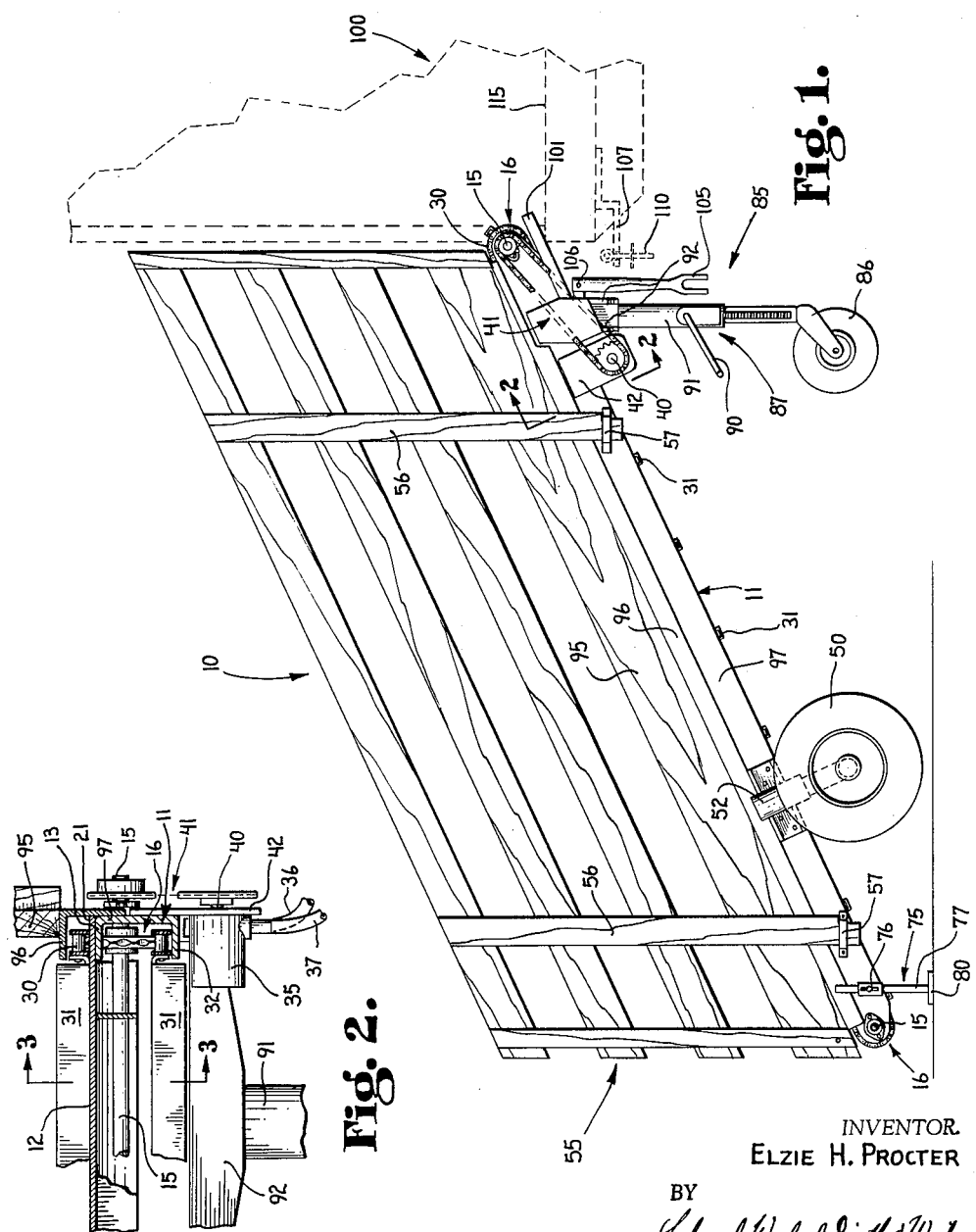
INVENTOR.
ELZIE H. PROCTER
BY
*Jackwood, Woodard, Smith & Weikart*
Attorneys Dec. 28, 1965  E. H. PROCTER  3,225,744
STOCK LOADER
Filed April 16, 1964  2 Sheets-Sheet 2

INVENTOR.
ELZIE H. PROCTER
BY Lockwood, Woodard, Smith & Weikart
Attorneys

United States Patent Office 3,225,744
Patented Dec. 28, 1965

3,225,744
STOCK LOADER
Elzie H. Procter, Rte. 3, Elwood, Ind.
Filed Apr. 16, 1964, Ser. No. 360,327
3 Claims. (Cl. 119—82)

The present invention relates to a loading device particularly adapted for loading and unloading stock and the like on and off of trucks.

Presently available hog chutes require the attendance of a man to prod the hogs in order to cause them to move up the chute into the truck. A power conveyor might be provided for the hogs except for the fact that their relatively small hoofs combined with their relatively great weight would puncture any standard belt. Consequently, a primary object of the present invention is to provide an improved loading device particularly adapted for moving hogs on and off a truck for transporting to market and the like.

Another object of the invention is to provide a powered loading device capable of withstanding the great pressure of animal hoofs yet of relatively inexpensive construction.

Still another object of the invention is to provide a loading device capable of easy and quick transporting from place to place and of easy and quick adjustment adjacent a truck for the loading and unloading thereof.

A further object of the invention is to provide a stock loading device which does not require excessive prodding of the stock to get it on the truck and which is relatively safe.

Related objects and advantages will become apparent as the description proceeds.

One embodiment of the present invention might include a stock loader comprising an inclined conveyor having a fixed support plate for supporting objects moving on the conveyor and also having slats movable across the plate to move the objects. Road wheels are secured to the opposite sides of the conveyor adjacent the lower end thereof and can be lifted off the ground by means of jacks also secured to the conveyor adjacent the lower end thereof. A ramp extends from the ground over the lower end of the conveyor and is swingably connected to the conveyor. A manually projectable swiveling dolly wheel supports the upper end of the conveyor and permits raising and lowering the upper end of the conveyor and positioning thereof.

The full nature of the invention will be understood from the accompanying drawings and the following description and claims:

FIG. 1 is a side elevation of the loading device of the present invention.

FIG. 2 is an enlarged section taken along the lines 2—2 of FIG. 1.

Figure 3:
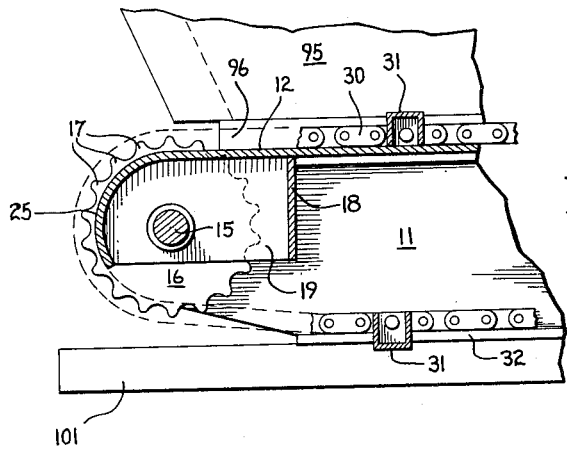
FIG. 3 is an enlarged section taken along the line 3—3 of FIG. 2 in the direction of the arrows.
Figure 4:
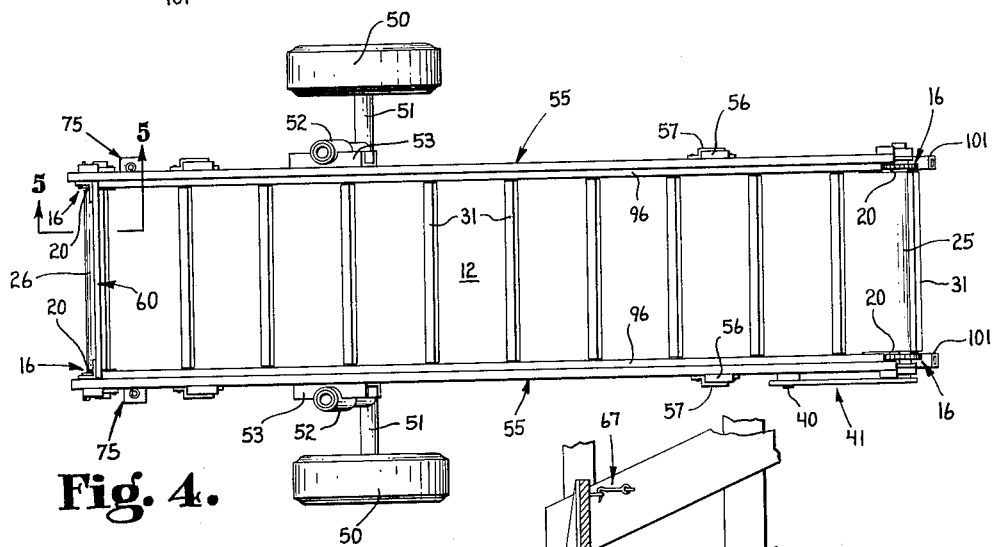
FIG. 4 is a top plan view of the structure of FIG. 1.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings, there is illustrated a stock loader 10 which consists of a pair of inclined channels 11 opening inwardly toward one another and spaced in parallel relation. An elongated plate 12 of rigid material is fixed to the top leg 13 of each channel 11 and extends above and between the channels 11. Plate 12 forms an important part of the present structure because upon it the weight of the objects being conveyed and particularly the great weight of hogs exerted upon relatively small hoofs is exerted. For this reason, the plate 12 should consist of relatively sturdy material.

A pair of parallel shafts 15 are journal mounted upon the channels 11 at the opposite ends thereof and extend between the channels 11. Fixedly mounted upon each of the shafts 15 is a pair of sprockets 16. Each of the sprockets 16 has a plurality of teeth 17 which project through the plate 12 and more particularly through respective slots 20 in the plate 12 adjacent the opposite transverse edges 21 thereof. The plate 12 curves at its upper end portion 25 and at its lower end portion 26 about the axis of the shafts 15. Transverse braces 18 are fixed to the channels 11 and support the plate 12. Members 19 extend longitudinally of the conveyor, are fixed to the transverse brace 18 and support the inside part of each end portion 25 and 26.

A pair of chains 30 are trained about the sprockets 16 with each chain 30 meshing with one of the upper sprockets 16 and also with one of the lower sprockets 16. Thus, each of the chains 30 extends along one opposite transverse edge 21 of the plate 12. A plurality of slats 31 each having a channel shape are fixed at their opposite ends to the respective chains 30 and are spaced in parallel relation and at equal intervals along the closed lengths of the chains 30.

Because of the position of the sprockets 16 relative to the plate 12, the chains 30 lie across the upper surface of the plate 12. The portion of the chain 30 which is below the plate 12 is supported upon the lower legs 32 of the channels 11. The means for rotating the shafts 15 to drive the conveyor consists of an hydraulic motor 35, Orbit model, manufactured by Charlynn Co. of Minneapolis, Minnesota. Hydraulic feed and return conduits 36 and 37 are provided for connection to the hydraulic system of the truck.

The drive shaft 40 of the orbit motor 35 has a chain and sprocket arrangement 41 connected thereto which is, in turn, connected to the upper shaft 15. Thus, operation of the orbit motor 35 causes rotation of the upper shaft 15 and rotation of the sprockets 16, chains 30 and further causes the movement of the slats 31 across the upper surface of the plate 12. Because of the relationship between the sprockets and the plate, the slats 31 move very closely to the plate 12 and do not pinch the hoofs of the hogs.

The orbit motor 35 is fixed to a depending member 42 which is secured to one of the channels 11. Also secured to channels 11 is a pair of road wheels 50. The road wheels 50 include conventional balloon tires and wheels rotatably mounted upon axles 51 which are, in turn, secured by means of upright elements 52 to the channels 53 fixed to the channels 11.

Figure 5:
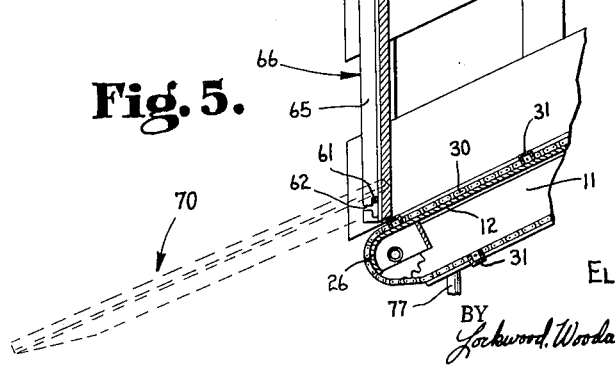
FIG. 5 is a fragmentary section taken along the lines 5—5 of FIG. 4 in the direction of the arrows and showing alternative positions of a loading ramp with one of said alternative positions in dotted lines.

Removably secured to the channels 11 are fences 55 which include upright posts 56 received within brackets 57 fixed to the channels 11. A ramp 60 is swingably mounted upon the fences 55 by means of pins 61 which project inwardly from the fences 55 and are received within a T-slot 62 each of which is located in one leg 65 of the ramp brace 66. It can be seen from FIG. 5 that the ramp 60 can either be hooked by the hook 67 in upright position or swung into the dotted line position 70 wherein the ramp extends over and overlaps the lower end 26 of the plate 12. Because of the overlapping relationship of the ramp 60, the hog steps downwardly onto the plate 12 and consequently, excessive prodding of the hog is not necessary.

Also mounted upon the channels 11 is a pair of adjustable support elements 75 which can be used to raise the loading device off of the road wheels 50 in order to better fix the loading device in position for loading or unloading. The support elements 75 are provided with locking means 76 including a thumb screw for fixing the rod 77 in position. Upon the lower end of each rod 77 is a pad 80.

Adjacent the upper end of the stock loader, there is secured a dolly 85. The dolly 85 includes a swivel wheel 86 and a rack and pinion arrangement 87 for raising and lowering the swivel wheel 86. The rack and pinion arrangement is easily operated by a manual crank 90 which has sufficient mechanical advantage to crank the swivel wheel 86 down and to raise the upper end of the conveyor even though the full weight of the conveyor is resting upon the swivel wheel.

The dolly 85 is conventional in nature and may be, for example, a Bull Dog Jack, manufactured by Hammerblow Tool Company of Wassau, Wisconsin. The upper end of the dolly 85 includes a hollow member 91 which is fixed to a pair of cross members 92 fixed at their opposite ends to the channels 11. It should be noted that the longitudinally extending lower members 95 of the fences 55 rest upon and are supported by angles 96 each of which is secured to the outer upper surface of the base portion 97 of a respective angle 11.

Alternative means can be provided for supporting the upper end of the conveyor or stock loader on the truck 100. There are illustrated two members 101 which are fixed to the channels 11 and which frictionally engage the truck to support the stock loader as illustrated in FIG. 1. Alternatively, the upper end of the stock loader might be supported by a hook fixed relative to the channels 11 and positioned centrally of the upper end of the stock loader, said hook engaging a suitable aperture in the rearward end of the truck 100. Such an arrangement might better permit the positioning of the loader so that it is not directly aligned with the bed of the truck. A further alternative means of securing the upper end of the stock loader to the rearward end of the truck might include hooks on the projecting ends of the members 101, said hooks engaging suitable apertures in the rear of the truck.

A tow member 105 is swingably secured to a member 92 for swinging about an axis 106. The tow member 105 may be pinned to truck tow member 107 by means of the pintle 110. When the stock loader is being towed, the dolly 85 is raised as are the adjustable support members 75 so that the stock loader travels on its road wheels 50. In positioning the stock loader for loading or unloading, the dolly 85 is lowered and the stock loader moves on the dolly as well as on the road wheels 50.

From the above description, it will be evident that the present invention provides an improved loading device particularly adapted for moving hogs on and off a truck for transporting to market and the like. It will also be evident that the present invention provides a powered loading device capable of withstanding the great pressure exerted by animal hoofs.

It should also be noted that the upper end of the plate 12 is above the rear end of the bed 115 of the truck so that the hogs also step downwardly off of the stock loader and there is no danger of pinching of the hoofs. In the event that the stock loader is used to unload hogs from the truck, the upper end of the loader can be supported beneath the bed of the truck by means of the dolly 85 and the ramp 70 can be removed from the fences 55 and the pins 61 so that the hogs can step easily off of the plate 12.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A stock loader comprising a pair of spaced parallel elongated channels opening inwardly toward one another, an elongated plate of rigid material fixed to the top of said channels and extending therebetween and having curved opposite end portions, a pair of parallel shafts journal mounted on said channels and extending therebetween with each of said shafts parallel and each located below an opposite end portion of said plate, a pair of sprockets fixedly mounted on each of said shafts, each of said plate curved end portions being curved about the axis of a respective one of said shafts and each having a pair of slots each adjacent a transverse edge of said plate with the teeth of each sprocket projecting through a respective slot, a pair of closed chains each trained across one of the sprockets of each pair and extending longitudinally of said plate adjacent a respective transverse edge thereof, a plurality of parallel slats fixed at their opposite ends to the respective chains and spaced at equal intervals along the complete closed lengths of said chains, means for rotating one of said shafts to drive said loader, said plate being on an incline providing an upper end portion and a lower end portion, and road wheels rotatably mounted on said channels adjacent said lower end portion and positioned on opposite sides of said loader.

2. A stock loader comprising a pair of spaced parallel elongated channels opening inwardly toward one another, an elongated plate of rigid material fixed to the top of said channels and extending therebetween and having curved opposite end portions, a pair of parallel shafts journal mounted on said channels and extending therebetween with each of said shafts parallel and each located below an opposite end portion of said plate, a pair of sprockets fixedly mounted on each of said shafts, each of said plate curved end portions being curved about the axis of a respective one of said shafts and each having a pair of slots each adjacent a transverse edge of said plate with the teeth of each sprocket projecting through a respective slot, a pair of closed chains each trained across one of the sprockets of each pair and extending longitudinally of said plate adjacent a respective transverse edge thereof, a plurality of parallel slats fixed at their opposite ends to the respective chains and spaced at equal intervals along the complete closed lengths of said chains, means for rotating one of said shafts to drive said loader, said plate being on an incline with one curved end portion an upper end portion and the other curved end portion a lower end portion, road wheels rotatably mounted on said channels adjacent said lower end portion and positioned on opposite sides of said loader, fences removably secured to said channels on opposite sides of said plate and projecting upwardly above said plate, a pair of adjustable support elements mounted on said channels adjacent said lower end portion for lifting said loader off said road wheels, and a dolly fixed to said channels adjacent said upper end portion and adapted to support said plate in said inclined position, said dolly including a swivel wheel and a manually operable rack and pinion for raising and lowering said upper end portion.

3. A stock loader comprising a pair of spaced parallel elongated channels opening inwardly toward one another, an elongated plate of rigid material fixed to the top of said channels and extending therebetween and having curved opposite end portions, a pair of parallel shafts journal mounted on said channels and extending therebetween with each of said shafts parallel and each located below an opposite end portion of said plate, a pair of sprockets fixedly mounted on each of said shafts, each of said plate curved end portions being curved about the axis of a respective one of said shafts and each having a pair of slots each adjacent a transverse edge of said plate with the teeth of each sprocket projecting through a respective slot, a pair of closed chains each trained across one of the sprockets of each pair and extending longitudinally of said plate adjacent a respective transverse edge thereof, a plurality of parallel slats fixed at their opposite ends to the respective chains and spaced at equal intervals along the complete closed lengths of said chains, said slats having bottom portions which are proportioned to slidably engage said plate as said slats move above said plate means for rotating one of said shafts to drive said loader, said plate being on an incline with one curved end portion an upper end portion and the other a lower end portion, road wheels rotatably mounted on said channels adjacent said lower end portion and positioned on opposite sides of said loader, fences removably secured to said channels on opposite sides of said plate and projecting upwardly above said plate, a pair of adjustable support elements mounted on said channels adjacent said lower end portion for lifting said loader off said road wheels, a dolly fixed to said channels adjacent said upper end portion and adapted to support said plate in said inclined position, said dolly including a swivel wheel and a manually operable rack and pinion for raising and lowering said upper end portion, and a ramp pivotally connected to said fences adjacent said lower end portion and swingable to a position wherein said ramp engages the ground and extends and discharges over said lower end portion.

References Cited by the Examiner
UNITED STATES PATENTS

| | | | |
|---|---|---|---|
| 543,393 | 7/1895 | Mead | 119—82 |
| 2,107,465 | 2/1938 | Borggaard | 214—38 X |
| 2,395,075 | 2/1946 | Smith | 198—233 |
| 3,020,882 | 2/1962 | Browning | 119—82 |

SAMUEL KOREN, *Primary Examiner.*

HUGH R. CHAMBLEE, *Examiner.*